United States Patent
Li

(10) Patent No.: US 9,523,317 B1
(45) Date of Patent: Dec. 20, 2016

(54) FEEDFORWARD COMPENSATION FOR FUEL SYSTEM VACUUM RELIEF

(71) Applicant: Ford Global Technologies, LLC, Dearborn, MI (US)

(72) Inventor: Yonghua Li, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/825,928

(22) Filed: Aug. 13, 2015

(51) Int. Cl.
| | |
|---|---|
| F02M 1/00 | (2006.01) |
| F02D 41/00 | (2006.01) |
| F02M 25/08 | (2006.01) |
| F02D 11/10 | (2006.01) |
| F02M 37/00 | (2006.01) |

(52) U.S. Cl.
CPC ......... *F02D 41/0042* (2013.01); *F02D 11/105* (2013.01); *F02M 25/0836* (2013.01); *F02M 25/0854* (2013.01); *F02M 37/0082* (2013.01)

(58) Field of Classification Search
CPC ............. F02M 25/0836; F02D 19/0621; F02D 41/0032; F02D 41/004
USPC .................................. 123/516–520
See application file for complete search history.

(56) References Cited

U.S. PATENT DOCUMENTS

| | | | |
|---|---|---|---|
| 6,523,531 B1 | 2/2003 | Feldkamp et al. | |
| 6,657,315 B1 | 12/2003 | Peters et al. | |
| 6,664,651 B1 | 12/2003 | Kotre et al. | |
| 6,666,200 B2 | 12/2003 | Davis, Jr. et al. | |
| 7,086,392 B2 | 8/2006 | Suzuki | |
| 2013/0253799 A1 | 9/2013 | Peters et al. | |
| 2013/0297126 A1 | 11/2013 | Yamazaki et al. | |
| 2014/0230795 A1* | 8/2014 | Jentz ................ | F02M 25/0854 123/520 |
| 2015/0120108 A1* | 4/2015 | Dudar ................ | F02M 25/089 701/22 |
| 2016/0040630 A1* | 2/2016 | Li ................ | F02M 25/0809 73/40.5 R |
| 2016/0076469 A1* | 3/2016 | Pursifull ............ | F02D 41/0032 123/519 |

OTHER PUBLICATIONS

Grizzle, J.W. et al., "Improved Cylinder Air Charge Estimation for Transient Air FuelRatio Control," http://web.eecs.umich.edu/~grizzle/papers/airchg.pdf, Accessed Oct. 21, 2015, 6 pages.
Anonymous, "Hybrid Vehicle Fuel Tank Vacuum Relief Improvement" IPCOM No. 000242557, published Jul. 24, 2015, 2 pages.

* cited by examiner

*Primary Examiner* — John Kwon
(74) *Attorney, Agent, or Firm* — James Dottavio; Alleman Hall McCoy Russell & Tuttle LLP

(57) ABSTRACT

Methods and systems are provided for relieving excess fuel tank vacuum in a vehicle. In one example, responsive to a fuel tank vacuum above a threshold or a rise in fuel tank vacuum level being higher than a threshold rate, a canister purge valve is opened to dissipate the fuel tank vacuum into an engine intake manifold while the engine is combusting, and the amount of intake air inducted into the intake manifold is adjusted such that air/fuel ratio errors are reduced. In this way, fuel tank vacuum may be relieved under engine operating conditions wherein the likelihood of air/fuel ratio errors are high, thus enabling rapid relief of fuel tank vacuum such that fuel tank degradation can be reduced and fuel system integrity can be better maintained.

20 Claims, 5 Drawing Sheets

FEEDFORWARD COMPENSATION FOR FUEL SYSTEM VACUUM RELIEF

FIELD

The present description relates to systems and methods for relieving excess fuel system vacuum in a vehicle, such as a hybrid vehicle.

BACKGROUND/SUMMARY

Vehicles may be fitted with evaporative emission control systems to reduce the release of fuel vapors to the atmosphere. For example, vaporized hydrocarbons (HCs) from a fuel tank may be stored in a fuel vapor canister packed with an adsorbent which adsorbs and stores the vapors. At a later time, when the engine is in operation, the evaporative emission control system allows the vapors to be purged into the engine intake manifold for use as fuel.

During some conditions, excessive vacuum can build inside the evaporative emission control system. For example, due to degradation of a canister purge solenoid or a canister vent solenoid, or due to a restriction in the system's fresh air line, fuel tank vacuum levels may become excessive, potentially harming the fuel tank. While evaporative emission control systems may include hardware, such as fuel caps, to relieve excess vacuum, there may be conditions where relief is not provided due to hardware malfunction. Consequently, fuel tank vacuum level may rise to dangerous levels. In addition to costly fuel tank repairs and an increase in warranty, this can also result in increased operator dissatisfaction.

Fuel tank damage can be reduced if the trapped vacuum can be vented as soon as an elevated vacuum level is observed. Toward this end, US Patent Application No. 2014/0230795 A1 teaches opening a canister purge valve to dissipate fuel tank vacuum to an engine intake manifold while the engine is not combusting, or alternatively, opening a canister purge valve to dissipate fuel tank vacuum to an engine intake manifold while the engine is combusting and the likelihood of air/fuel ratio error is low. However, the inventors herein have recognized an issue with the above approach. In the case wherein the engine is combusting and the likelihood of air/fuel ratio error is high, fuel tank vacuum may not be relieved on time.

The inventors herein have recognized that fuel tank vacuum may be relieved during engine operating conditions wherein the risk of air/fuel ratio error is high by treating fuel tank vacuum relief as a disturbance to air/fuel ratio control. In one example, this may be achieved by a method for a fuel system coupled to an engine, comprising: in response to a fuel tank vacuum level above a threshold or a rise in fuel tank vacuum level being higher than the threshold rate, opening a canister purge valve to dissipate the fuel tank vacuum level into an engine intake manifold while the engine is combusting, and adjusting an amount of intake air inducted into the intake manifold based on the fuel tank vacuum level, such that manifold pressure is minimally affected while fuel tank vacuum is relieved. In this way, a feedforward compensation approach may be used such that fuel tank vacuum levels may be reliably returned to safer levels even under conditions wherein the risk of air/fuel ratio error may be high.

In one example, it may be determined that fuel tank vacuum needs to be vented to reduce potential fuel tank damage in a hybrid vehicle. Therein, a canister purge valve (CPV) may be opened to route intake air from downstream of an intake throttle to a fuel tank while an engine is not combusting, for example during a condition wherein the hybrid vehicle is being propelled solely by battery power. During other conditions, such as when the hybrid vehicle is propelled by the engine, the canister purge valve may be opened to route intake air from downstream of the intake throttle to the fuel tank while the engine is combusting, and an amount of intake air inducted into the intake manifold may be accordingly adjusted based on a determined amount of the intake air that is routed from downstream of the intake throttle to the fuel tank.

In this way, by monitoring changes in vacuum level of an isolated fuel tank, fuel tank vacuum build-up can be detected and addressed before fuel tank degradation is incurred. By venting the excess vacuum to the engine while the engine is not combusting, air-fuel errors are averted. Alternatively, by dissipating the excess vacuum to the intake while the engine is combusting and adjusting an amount of intake air inducted into the intake manifold based on a determined amount of the intake air that is routed from downstream of the intake throttle to the fuel tank, fuel tank vacuum may be relieved while air/fuel ratio errors may be reduced. By rapidly and reliably addressing excess fuel tank vacuum, fuel tank degradation can be reduced and fuel system integrity can be better maintained.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted above or in any part of this disclosure.

DETAILED DESCRIPTION

Figure 1:
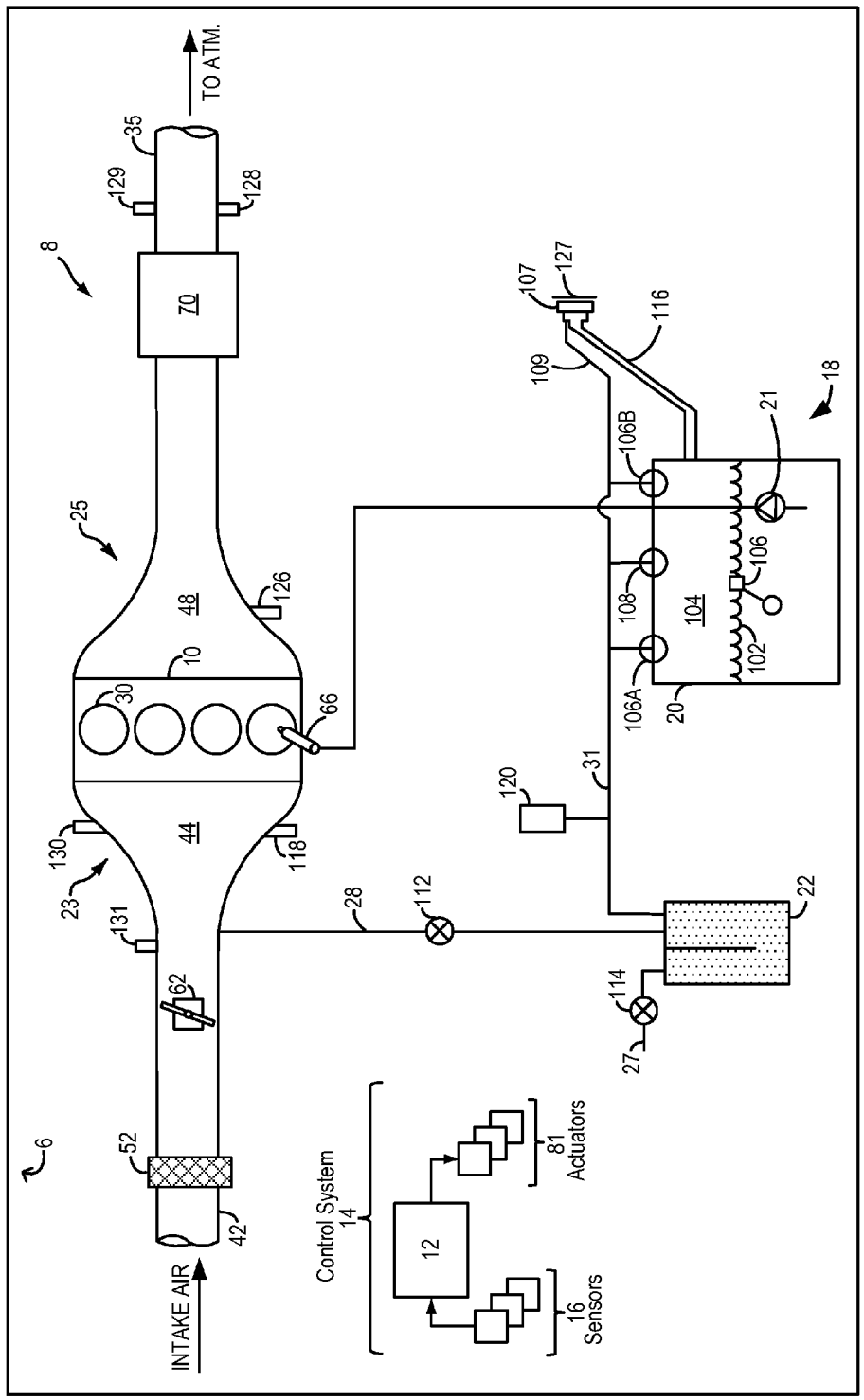
FIG. 1 shows a schematic depiction of a vehicle fuel system.
Figure 4:
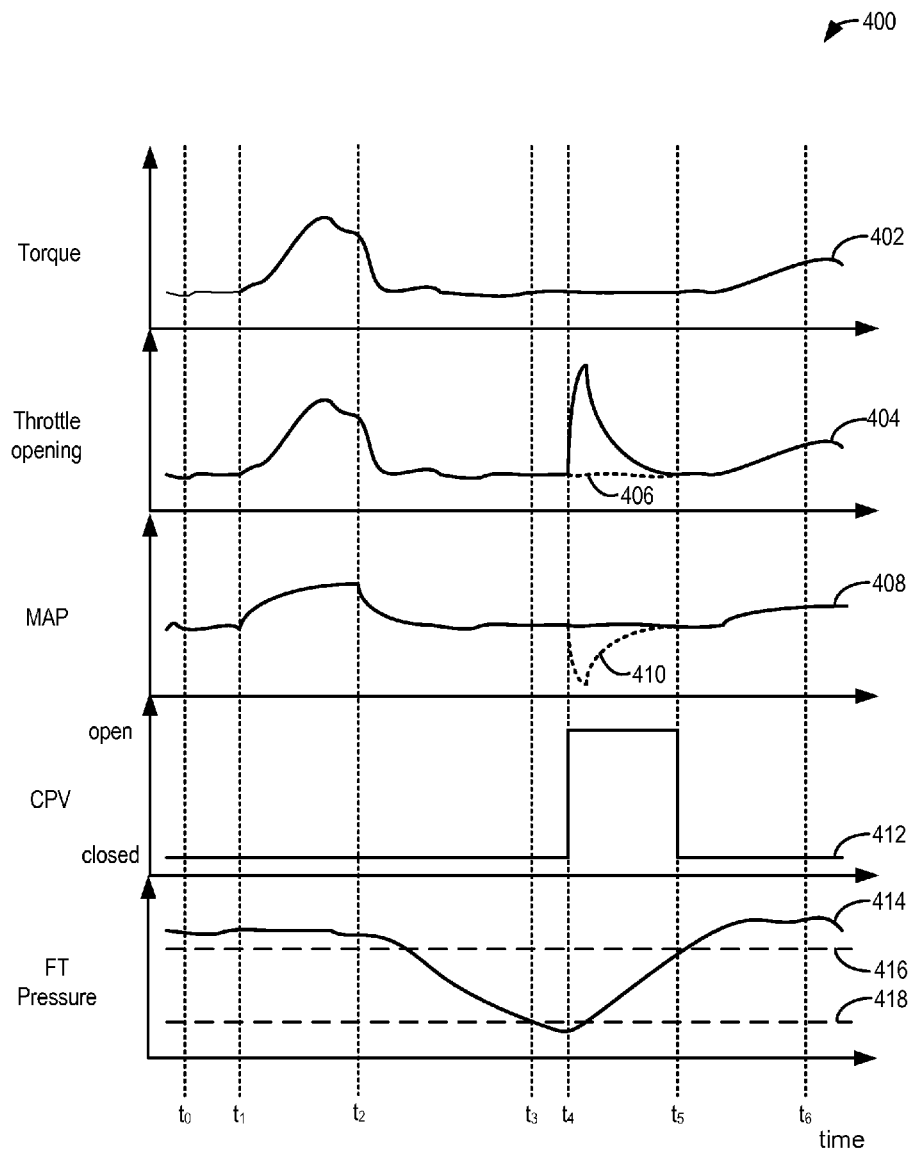
FIG. 4 shows a timeline for venting excess fuel tank vacuum to the engine intake manifold wherein the engine is combusting.
Figure 5:
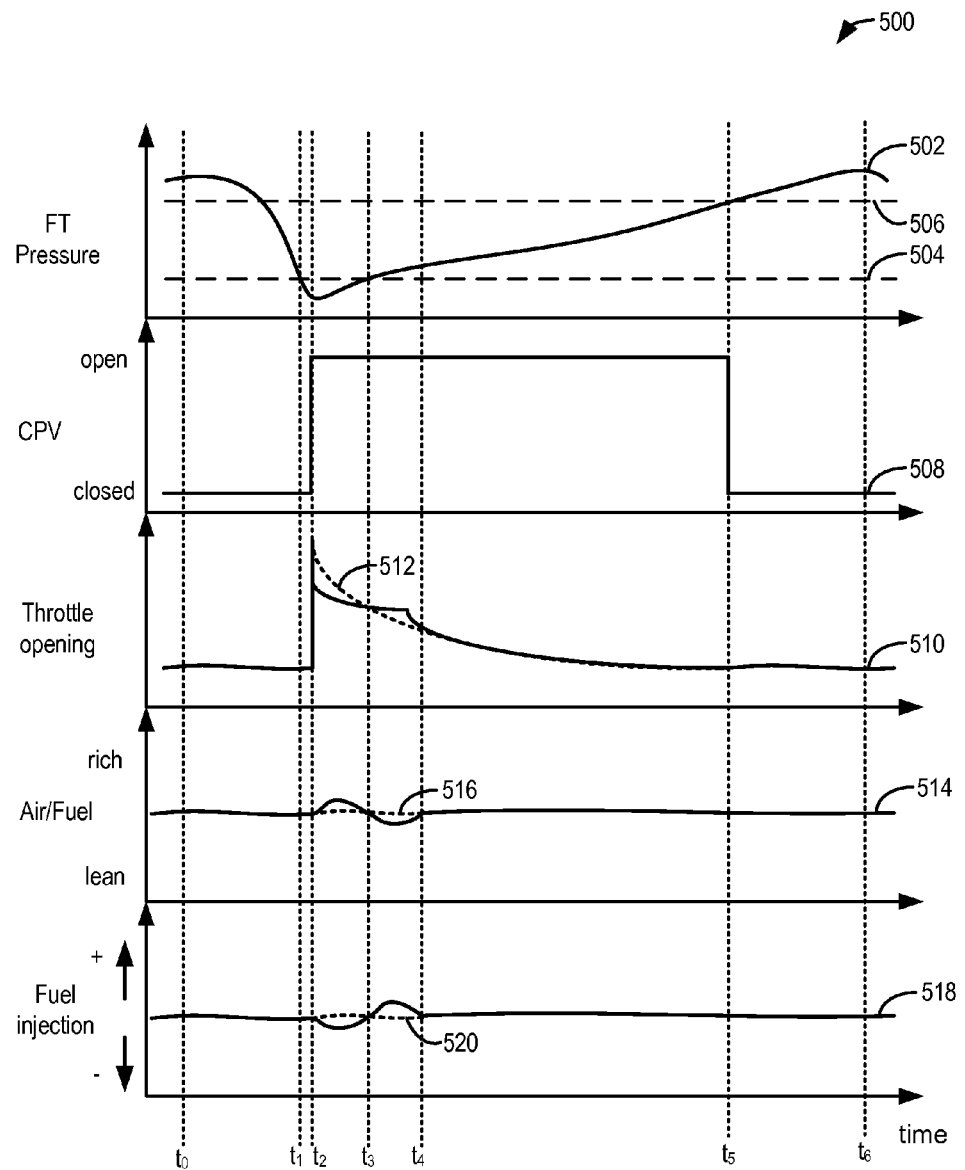
FIG. 5 shows a timeline for adjusting a predicted throttle position based on a learned compensating factor during venting of fuel tank vacuum to the engine intake manifold while the engine is combusting.

The following detailed description relates to systems and methods for venting vacuum from a fuel system coupled to a vehicle engine, such as the fuel system of FIG. 1. A controller may be configured to perform a control routine, such as the example routine of FIG. 2, to open a canister purge valve and relieve excess fuel tank vacuum to an engine intake manifold. During certain conditions, for example in a hybrid vehicle wherein the vehicle is being operated solely by power derived from the battery, the canister purge valve may be opened to route intake air from downstream of an intake throttle to a fuel tank while the engine is not combusting. During other conditions, such as when the engine is combusting, the canister purge valve may be opened to route intake air from downstream of the intake throttle to the fuel tank, and a feedforward air compensation term is added to the throttle control such that the air routed from downstream of the intake throttle to the fuel tank to relieve fuel tank vacuum may be compensated for by increased air inducted into the intake manifold. If feedforward air compensation is not utilized during fuel tank vacuum relief via opening a CPV, a manifold pressure error may result, thus disrupting air/fuel ratio, as compared to a reduced manifold pressure error when feedback air compensation is utilized, as illustrated by the graph in FIG. 3. A timeline for relieving fuel tank vacuum using feedforward air compensation in a vehicle operating via engine combustion incorporating these concepts is shown in FIG. 4. However, because feedforward air compensation adjustment to throttle control is a predicted throttle adjustment based on a number of engine operating parameters, there may be a small amount of error inherent to the calculated adjustment. By measuring air/fuel ratio a learned compensating factor may be determined. For example, the compensating factor may be such that the calculated feedforward air compensation term is increased or decreased as a function of the compensating factor, thus resulting in throttle control more accurately maintaining a desired air/fuel ratio. A timeline for venting fuel tank vacuum to engine intake in which a compensating factor is determined in order to further adjust throttle position based on the feedforward air compensation adjustment is illustrated in FIG. 5.

FIG. 1 shows a schematic depiction of a vehicle system 6. In one example, as depicted, vehicle system 6 is a hybrid electric vehicle system that can derive propulsion power from engine system 8 and/or an on-board energy storage device (not shown), such as a battery system. An energy conversion device, such as a generator (not shown), may be operated to absorb energy from vehicle motion and/or engine operation, and then convert the absorbed energy to an energy form suitable for storage by the energy storage device. In alternate examples, vehicle system 6 may be a non-hybrid vehicle system, such as a conventional internal combustion engine vehicle system.

Engine system 8 may include an engine 10 having a plurality of cylinders 30. Engine 10 includes an engine intake 23 and an engine exhaust 25. Engine intake 23 includes an air intake throttle 62 fluidly coupled to the engine intake manifold 44 via an intake passage 42. Air may enter intake passage 42 via air filter 52. Engine exhaust 25 includes an exhaust manifold 48 leading to an exhaust passage 35 that routes exhaust gas to the atmosphere. Engine exhaust 25 may include one or more emission control devices 70 mounted in a close-coupled position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 8 is a boosted engine system, the engine system may further include a boosting device, such as a turbocharger (not shown).

When configured as a hybrid vehicle system, the vehicle system may be operated in various modes. The various modes may include a full hybrid mode or battery mode, wherein the vehicle is driven by power from only the battery. The various modes may further include an engine mode wherein the vehicle is propelled with power derived only from the combusting engine. Further, the vehicle may be operated in an assist or mild hybrid mode wherein the engine is the primary source of torque and the battery selectively adds torque during specific conditions, such as during a tip-in event. A controller may shift vehicle operation between the various modes of operation based at least on vehicle torque/power requirements and the battery's state of charge. For example, when the power demand is higher, the engine mode may be used to provide the primary source of energy with the battery used selectively during power demand spikes. In comparison, when the power demand is lower and while the battery is sufficiently charged, the vehicle may be operated in the battery mode to improve vehicle fuel economy.

Engine system 8 is coupled to a fuel system 18. Fuel system 18 includes a fuel tank 20 coupled to a fuel pump 21 and a fuel vapor canister 22. Fuel tank 20 receives fuel via a refueling line 116, which acts as a passageway between the fuel tank 20 and a refueling door 127 on an outer body of the vehicle. During a fuel tank refueling event, fuel may be pumped into the vehicle from an external source through refueling inlet 107 which is normally covered by a gas cap. During a refueling event, one or more fuel tank vent valves 106A, 106B, 108 (described below in further details) may be open to allow refueling vapors to be directed to, and stored in, canister 22. Further, gas cap may enable fuel tank vacuum or pressure relief via, for example, a poppet valve. In other embodiments, the fuel system may be capless.

Fuel tank 20 may hold a plurality of fuel blends, including fuel with a range of alcohol concentrations, such as various gasoline-ethanol blends, including E10, E85, gasoline, etc., and combinations thereof. A fuel level sensor 106 located in fuel tank 20 may provide an indication of the fuel level ("Fuel Level Input") to controller 12. As depicted, fuel level sensor 106 may comprise a float connected to a variable resistor. Alternatively, other types of fuel level sensors may be used.

Fuel pump 21 is configured to pressurize fuel delivered to the injectors of engine 10, such as example injector 66. While only a single injector 66 is shown, additional injectors are provided for each cylinder. It will be appreciated that fuel system 18 may be a return-less fuel system, a return fuel system, or various other types of fuel system.

In some embodiments, engine 10 may be configured for selective deactivation. For example, engine 10 may be selectively deactivatable responsive to idle-stop conditions. Therein, responsive to any or all of idle-stop conditions being met, the engine may be selectively deactivated by deactivating cylinder fuel injectors. As such, idle-stop conditions may be considered met if the engine is combusting while a system battery (or energy storage device) is sufficiently charged, if auxiliary engine loads (e.g., air conditioning requests) are low, engine temperatures (intake temperature, catalyst temperature, coolant temperature, etc.) are within selected temperature ranges where further regulation is not required, and a driver requested torque or power demand is sufficiently low. In response to idle-stop conditions being met, the engine may be selectively and automatically deactivated via deactivation of fuel and spark. The engine may then start to spin to rest.

Vapors generated in fuel tank 20 may be routed to fuel vapor canister 22, via conduit 31, before being purged to engine intake 23. Fuel tank 20 may include one or more vent valves for venting diurnals and refueling vapors generated in the fuel tank to fuel vapor canister 22. The one or more vent valves may be electronically or mechanically actuated valve and may include active vent valves (that is, valves with moving parts that are actuated open or close by a controller) or passive valves (that is, valves with no moving parts that are actuated open or close passively based on a tank fill level). In the depicted example, fuel tank 20 includes gas vent valves (GVV) 106A, 106B at either end of fuel tank 20 and a fuel level vent valve (FLVV) 108, all of which are passive vent valves. Each of the vent valves 106A, 106B, 108 may include a tube (not shown) that dips to a varying degree into a vapor space 104 of the fuel tank. Based on a fuel level 102 relative to vapor space 104 in the fuel tank, the vent valves may be open or closed. For example, GVV 106A, 106B may dip less into vapor space 104 such that they are normally open. This allows diurnal and "running loss" vapors from the fuel tank to be released into canister 22, preventing over-pressurizing of the fuel tank. As another example, FLVV 108 may dip further into vapor space 104 such that it is normally open. This allows fuel tank over-filling to be prevented. In particular, during fuel tank refilling, when a fuel level 102 is raised, vent valve 108 may close, causing pressure to build in vapor line 109 (which is downstream of refueling inlet 107 and coupled thereon to conduit 31) as well as at a filler nozzle coupled to the fuel pump. The increase in pressure at the filler nozzle may then trip the refueling pump, stopping the fuel fill process automatically, and preventing overfilling.

It will be appreciated that while the depicted embodiment shows vent valves 106A, 106B, 108 as passive valves, in alternate embodiments, one or more of them may be configured as electronic valves electronically coupled to a controller (e.g., via wiring). Therein, a controller may send a signal to actuate the vent valves open or close. In addition, the valves may include electronic feedback to communicate an open/close status to the controller. While the use of electronic vent valves having electronic feedback may enable a controller to directly determine whether a vent valve is open or closed (e.g., to determine if a valve is closed when it was supposed to be open), such electronic valves may add substantial costs to the fuel system. Also, the wiring required to couple such electronic vent valves to the controller may act as a potential ignition source inside the fuel tank, increasing fire hazards in the fuel system.

Returning to FIG. 1, fuel vapor canister 22 is filled with an appropriate adsorbent for temporarily trapping fuel vapors (including vaporized hydrocarbons) generated during fuel tank refueling operations, as well as diurnal vapors. In one example, the adsorbent used is activated charcoal. When purging conditions are met, such as when the canister is saturated, vapors stored in fuel vapor canister 22 may be purged to engine intake 23, specifically intake manifold 44, via purge line 28 by opening canister purge valve 112. While a single canister 22 is shown, it will be appreciated that fuel system 18 may include any number of canisters.

Canister 22 includes a vent 27 (herein also referred to as a fresh air line) for routing gases out of the canister 22 to the atmosphere when storing, or trapping, fuel vapors from fuel tank 20. Vent 27 may also allow fresh air to be drawn into fuel vapor canister 22 when purging stored fuel vapors to engine intake 23 via purge line 28 and purge valve 112. While this example shows vent 27 communicating with fresh, unheated air, various modifications may also be used. Vent 27 may include a canister vent valve 114 to adjust a flow of air and vapors between canister 22 and the atmosphere. The canister vent valve may also be used for diagnostic routines. When included, the vent valve may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the vent valve may be opened to allow a flow of fresh air to strip the fuel vapors stored in the canister. By closing canister vent valve 114, the fuel tank may be isolated from the atmosphere.

When configured as a hybrid, vehicle system 6 may have reduced engine operation times due to the vehicle being powered by engine system 8 during some conditions, and by the energy storage device (not shown) under other conditions. While the reduced engine operation times reduce overall carbon emissions from the vehicle, they may also lead to insufficient purging of fuel vapors from the vehicle's emission control system. To address this, in some embodiments, a fuel tank isolation valve (not shown) may be optionally included in conduit 31 such that fuel tank 20 is coupled to canister 22 via the isolation valve. When included, the isolation valve may be kept closed during engine operation so as to limit the amount of diurnal vapors directed to canister 22 from fuel tank 20. During refueling operations, and selected purging conditions, the isolation valve may be temporarily opened to direct fuel vapors from the fuel tank 20 to canister 22. By opening the valve during refueling operations and selected purging conditions when the fuel tank pressure is higher than a threshold (e.g., above a mechanical pressure limit of the fuel tank above which the fuel tank and other fuel system components may incur mechanical damage), the vapors may be released into the canister and the fuel tank pressure may be maintained below pressure limits.

One or more pressure sensors 120 may be coupled to fuel system 18 for providing an estimate of a fuel system pressure. In one example, the fuel system pressure is a fuel tank pressure, wherein pressure sensor 120 is a fuel tank pressure sensor coupled to fuel tank 20 for estimating a fuel tank pressure or vacuum level. While the depicted example shows pressure sensor 120 coupled between the fuel tank and canister 22, in alternate embodiments, the pressure sensor may be directly coupled to fuel tank 20.

Fuel vapors released from canister 22, for example during a purging operation, may be directed into engine intake manifold 44 via purge line 28. The flow of vapors along purge line 28 may be regulated by canister purge valve 112, coupled between the fuel vapor canister and the engine intake. The quantity and rate of vapors released by the canister purge valve may be determined by the duty cycle of an associated canister purge valve solenoid (not shown). As such, the duty cycle of the canister purge valve solenoid may be determined by the vehicle's powertrain control module (PCM), such as controller 12, responsive to engine operating conditions, including, for example, engine speed-load conditions, an air-fuel ratio, a canister load, etc. By commanding the canister purge valve to be closed, the controller may seal the fuel vapor recovery system from the engine intake. An optional canister check valve (not shown) may be included in purge line 28 to prevent intake manifold pressure from flowing gases in the opposite direction of the purge flow. As such, the check valve may be necessary if the canister purge valve control is not accurately timed or the canister purge valve itself can be forced open by a high intake manifold pressure. An estimate of the manifold absolute pressure (MAP) may be obtained from MAP sensor 118 coupled to intake manifold 44, and communicated with controller 12. Alternatively, MAP may be inferred from alternate engine operating conditions, such as mass air flow (MAF), as measured by a MAF sensor 130 coupled to the intake manifold.

Fuel system 18 may be operated by controller 12 in a plurality of modes by selective adjustment of the various valves and solenoids. For example, the fuel system may be operated in a fuel vapor storage mode wherein the controller 12 may close canister purge valve (CPV) 112 and open canister vent valve 114 to direct refueling and diurnal vapors into canister 22 while preventing fuel vapors from being directed into the intake manifold. As another example, the fuel system may be operated in a refueling mode (e.g., when fuel tank refueling is requested by a vehicle operator), wherein the controller 12 may maintain canister purge valve 112 closed, to depressurize the fuel tank before allowing enabling fuel to be added therein. As such, during both fuel storage and refueling modes, the fuel tank vent valves 106A, 106B, and 108 are assumed to be open.

As yet another example, the fuel system may be operated in a canister purging mode (e.g., after an emission control device light-off temperature has been attained and with the engine running), wherein the controller 12 may open canister purge valve 112 and open canister vent valve 114. As such, during the canister purging, the fuel tank vent valves 106A, 106B, and 108 are assumed to be open (though in some embodiments, some combination of valves may be closed). During this mode, vacuum generated by the intake manifold of the operating engine may be used to draw fresh air through vent 27 and through fuel vapor canister 22 to purge the stored fuel vapors into intake manifold 44. In this mode, the purged fuel vapors from the canister are combusted in the engine. The purging may be continued until the stored fuel vapor amount in the canister is below a threshold. During purging, the learned vapor amount/concentration can be used to determine the amount of fuel vapors stored in the canister, and then during a later portion of the purging operation (when the canister is sufficiently purged or empty), the learned vapor amount/concentration can be used to estimate a loading state of the fuel vapor canister. For example, one or more oxygen sensors (not shown) may be coupled to the canister 22, or positioned in the engine intake and/or engine exhaust, to provide an estimate of a canister load (that is, an amount of fuel vapors stored in the canister). Based on the canister load, and further based on engine operating conditions, such as engine speed-load conditions, a purge flow rate may be determined.

As such, if any of the canister purge valve or canister vent valve is degraded (e.g., stuck open or stuck closed), excessive vacuum can result in the fuel tank. This can degrade the fuel tank if not addressed. While various pressure relief valves and vent valves are coupled to the fuel system to reduce the build-up of pressure (positive or negative pressure) in the fuel tank, the inventors herein have recognized that there may be conditions where due to hardware malfunction, adequate pressure relief via the pressure relief valve(s) is not achieved. Accordingly, to reduce the likelihood of excess vacuum induced fuel tank damage, the canister purge valve may be opened in response to a rise in fuel tank vacuum so as to dissipate the excess vacuum to the engine intake manifold. As elaborated in FIG. 2, the vacuum may be dissipated while the engine is not combusting. For example, where the vehicle system is a hybrid vehicle system, the canister purge valve may be opened to dissipate the excess vacuum to the intake manifold during a battery (or electric) mode of operation. By venting the excess vacuum to the intake manifold while the engine is not combusting, air-fuel errors are averted. As one example, an excessive vacuum condition could be a result of any type of blockage in the fuel lines between the fuel tank, through the canister, and to atmosphere. The blockage could be temporary (e.g., due to snow or water) or permanent as a result of dirt/dust contamination or a CVV stuck closed.

The vacuum may alternatively be dissipated to the intake manifold while the engine is running. As venting the fuel tank to the intake manifold routes air from upstream of the intake manifold to the fuel tank in order to relieve fuel tank vacuum, an air deficit in the intake manifold may thus result in engine air/fuel ratio error. As such, by relieving fuel tank vacuum to the intake manifold under conditions wherein air/fuel ratio error is likely to be low, for example following a tip-in where a pedal position is displaced by more than a threshold amount (e.g., a throttled pedal aggressive tip-in), fuel tank vacuum may be relieved and air/fuel ratio disturbance averted. However, there may be cases when fuel tank vacuum relief is indicated during engine operating conditions wherein opening the CPV to relieve fuel tank vacuum is likely to result in air/fuel ratio error, for example when load is relatively low due to high-way cruising with battery providing most but not all propulsive power. In such a circumstance, delaying fuel tank vacuum relief until engine operating conditions are such that air/fuel ratio error due to CPV opening is low increases the chance of fuel system damage, as the fuel tank vacuum may not be relieved on time. As such, enabling fuel tank vacuum relief regardless of engine operating conditions while the engine is combusting is desirable. As described in more detail in FIGS. 2-5 below, throttle position may be adjusted to compensate for the reduction in intake manifold air amount resulting from CPV opening to relieve fuel tank vacuum to the intake manifold. In some examples, the throttle may be controlled to maintain a target intake manifold pressure based on, for example, operator requested torque. The change to the intake manifold pressure caused by opening the CPV to relieve fuel tank vacuum may be compensated by adjusting the position of the throttle. More specifically, manifold pressure can be linked to air flow input and cylinder air output (assuming constant engine speed), and fuel tank vacuum relief by switching on and off the CPV according to the following equations:

If the CPV is open $$dP_{man}/dt = RT/V * u\_maf(t) - \beta_1 * P_{man} - \beta_2 * (P_{man} - P_{tnk})^{-0.5}$$

$$dP_{tnk} = \beta_2 * (P_{man} - P_{tnk})$$

or otherwise:

$$dP_{man}/dt = RT/V * u\_maf(t) - \beta_1 * P_{man}$$

$$dP_{tnk} = 0$$

wherein $P_{man}$ is manifold pressure, which may reflect cylinder air charge, $P_{tnk}$ is fuel tank pressure, $u\_maf$ is mass air flow to the intake manifold, R is the universal gas constant, V is manifold volume, T is intake temperature, $\beta_1$ is a coefficient as a nonlinear function of engine speed and manifold pressure, and $\beta_2$ is a coefficient as a function of fuel tank gas space, air intake temperature, measured or inferred fuel tank temperature, both manifold pressure and fuel tank pressures, and diameter of the vapor line (which is a constant for a given system).

As discussed in more detail below, a feedforward air compensation term may be calculated based on a measured pressure difference between intake manifold pressure and fuel tank pressure, intake air temperature, measured or inferred fuel tank temperature, and gas space of the fuel tank such that based on the equations described above governing the dynamics of the manifold and the fuel tank, the throttle may be adjusted such that manifold pressure may be minimally impacted as a result of fuel tank vacuum relief.

In another example, in a case wherein fuel tank vacuum relief is indicated during engine operating conditions and wherein opening the CPV to relieve fuel tank vacuum is likely to result in air/fuel ratio error yet immediate vacuum relief is desired, engine operating conditions may be purposely adjusted to operate under conditions where air/fuel ratio error is unlikely. For example, a battery state of charge (SOC) may be indicated and if the battery SOC is not higher than a predetermined value, battery operation may be changed over to a charge mode with maximum charge current allowed such that engine load may be substantially increased. In this way, by increasing engine load during conditions wherein fuel tank vacuum relief is required, air/fuel ratio error may be averted.

It will be appreciated that while the depicted embodiment of fuel system 18 includes various vent valves and pressure relief valves to relieve fuel tank pressure, and uses the combination of the pressure relief valves and the opening of the canister purge valve to maintain fuel tank pressures, in alternate embodiments, the fuel system may have fewer pressure relief valves (e.g., no pressure relief valves) and may rely only on the opening of the canister purge valve, as elaborated at FIGS. 2-5, to provide pressure relief.

Vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas (air/fuel ratio) sensor 126 located upstream of the emission control device, exhaust temperature sensor 128, MAP sensor 118, and exhaust pressure sensor 129, and intake air sensor 131. Other sensors such as additional pressure, temperature, air/fuel ratio, and composition sensors may be coupled to various locations in the vehicle system 6. As another example, the actuators may include fuel injector 66, canister purge valve 112, canister vent valve 114, and throttle 62. The control system 14 may include a controller 12. The controller may receive input data from the various sensors, process the input data, and trigger the actuators in response to the processed input data based on instruction or code programmed therein corresponding to one or more routines. Example control routines are described herein with regard to FIGS. 2-5.

In this way, the system of FIG. 1 enables a method for a fuel system coupled to an engine wherein, in response to fuel tank vacuum level (e.g., in response to fuel tank vacuum level being higher than a threshold level and/or in response to a rise in fuel tank vacuum level being higher than a threshold rate), a canister purge valve is opened to dissipate excess fuel tank vacuum into an engine intake manifold. In one example, if the indication of excess fuel tank vacuum is received while a hybrid vehicle is in an engine mode, the vacuum may be dissipated to the intake while the engine is combusting, regardless of engine operating conditions, by throttle adjustments to compensate for the amount of air routed from downstream of the intake throttle to the fuel tank in order to relive fuel tank vacuum.

Figure 2:
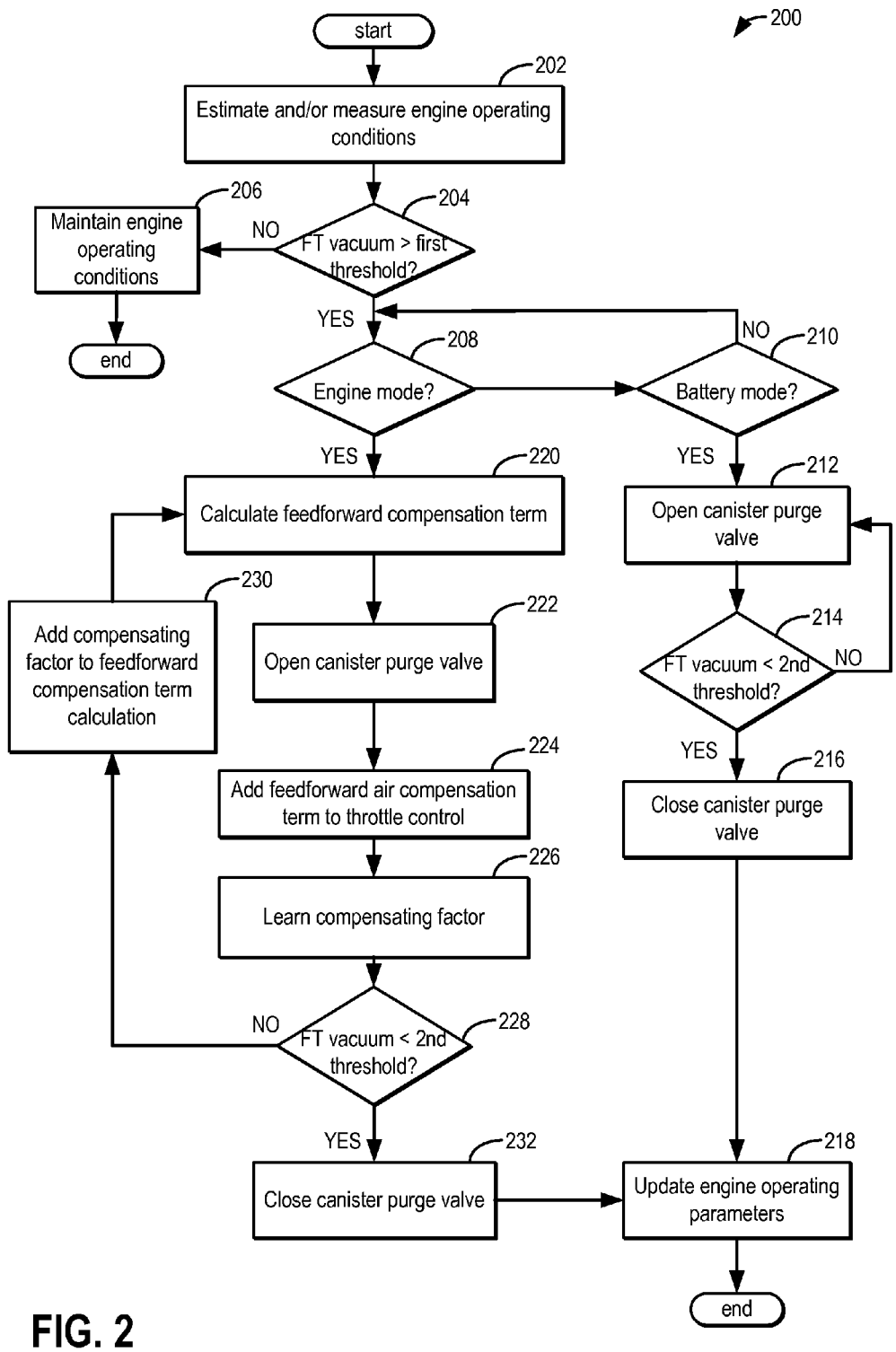
FIG. 2 shows an example high-level method for venting excess fuel tank vacuum to the engine intake manifold.

Now turning to FIG. 2, an example routine 200 is shown for venting excess fuel tank vacuum to an engine intake in a hybrid vehicle system. More specifically method 200 may be used to indicate the presence of excess fuel tank vacuum, and if excess fuel tank vacuum is indicated, in a first condition, relieve fuel tank vacuum to engine intake while the engine is not combusting, and in a second condition, relieve fuel tank vacuum to engine intake while the engine is combusting and with an amount of intake air inducted into the intake manifold adjusted such that intake manifold pressure error is reduced. For example, relieving fuel tank vacuum to engine intake while the engine is combusting may include adjusting an amount of intake air inducted into the intake manifold via setting an initial throttle position based on vehicle operator requested torque, determining a difference between a determined amount of the intake air routed from downstream of the intake throttle to the fuel tank and an air charge demand to meet the operator requested torque, and adjusting the throttle position based on the difference. Method 200 will be described with reference to the systems described herein and shown in FIG. 1, though it should be understood that similar methods may be applied to other systems without departing from the scope of this disclosure. Method 200 may be carried out by a controller, such as controller 12 in FIG. 1, and may be stored at the controller as executable instructions in non-transitory memory. Instructions for carrying out method 200 may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

Method 200 begins at 202 and includes estimating and/or measuring engine operating conditions. These may include, for example, vehicle speed, driver demand, engine speed, ambient conditions, engine temperature, fuel level, fuel tank pressure and temperature (if available, otherwise, it can be inferred from one or more of ambient temperature and engine on time), fuel tank vacuum level, etc. At 204, it may be determined if there is excess fuel tank vacuum. In particular, it may be determined if the estimated fuel tank vacuum level is higher than a threshold level (for example, higher than 16 InH2O) or a rise in fuel tank vacuum level is higher than a threshold rate (for example higher than 4 or 8 InH2O/sec). The threshold fuel tank vacuum may be a fixed threshold, or it may be variable based on operating conditions. For example, the threshold may be based on intake manifold vacuum such that fuel tank vacuum is only indicated as being above a threshold if intake manifold vacuum is less than fuel tank vacuum. If the fuel tank vacuum level or the rate of rise in the fuel tank vacuum is not above a threshold level, method 200 proceeds to 206. At 206, method 200 includes maintaining engine operating conditions. Maintaining engine operating conditions may include maintaining the canister purge valve (e.g., 112) in its current state (e.g., closed). Method 200 may then end.

If at 204 it is indicated that fuel tank vacuum level is greater than a threshold, method 200 proceeds to 208. At 208, method 200 includes indicating whether the vehicle is operating in engine mode. For example, it may be determined if the engine is combusting and the vehicle is being propelled, at least in part, by power derived from the combusting engine. If at 208, method 200 indicates that the vehicle is not operating in engine mode, method 200 proceeds to 210. At 210, method 200 includes indicating whether the vehicle is operating in battery mode. For example, it may be determined if the vehicle is being propelled completely using power derived from the system battery. If at 210, battery mode is confirmed, method 200 proceeds to 212 where the canister purge valve is commanded open to vent fuel tank vacuum to the engine intake. Venting fuel tank vacuum to the engine intake when the vehicle is operating in battery mode at 212 accordingly may not include throttle adjustments. Proceeding to 214, method 200 includes indicating whether fuel tank vacuum has decayed to a second threshold. If fuel tank vacuum has not decayed to the second threshold, the canister purge valve is kept open such that fuel tank vacuum may continue to be dissipated to the engine intake. At 214, if fuel tank vacuum has decayed to the second threshold, method 200 proceeds to 216. At 216, method 200 includes closing the CPV. Method 200 then proceeds to 218, where engine operating parameters are updated as a result of the need for fuel tank vacuum relief. For example, updating engine operating parameters at 218 may include updating a canister purge schedule as venting the fuel tank to the intake manifold may purge hydrocarbon stored in the vapor canister to the fuel tank. Additionally, updating engine operating parameters at 218 may include indicating the need for additional diagnostic tests to isolate the source of the fuel tank vacuum build, notifying an operator of a potential problem with one or more fuel system components, and/or setting a diagnostic code. Method 200 may then end. Method 200 may then end.

Returning to 208, if it is determined that the vehicle is operating in engine mode, method 200 proceeds to 220. At 220, method 200 includes calculating a feedforward compensation term for throttle control based on a pressure difference between the intake manifold pressure, measured by the MAP sensor (e.g., 118), and the fuel tank pressure, measured by the fuel tank pressure sensor (e.g., 120). The feedforward compensation term may be further based on an intake air temperature, measured by the intake air temperature sensor (e.g., 131), a fuel tank temperature, inferred via a lookup table comprising ambient temperature and engine-on time, and a gas space of the fuel tank. The gas space of the fuel tank may represent the volume of the fuel tank not occupied by fuel. For example, a gas space of the fuel tank may be calculated based on the difference between the volume of the fuel tank and the volume of fuel, where the volume of fuel may be calculated based on the level of fuel as measured by fuel level sensor (e.g., 106). Based on the indicated pressure difference between intake manifold and fuel tank, intake air temperature, measured or inferred fuel tank temperature, and gas space of the fuel tank, an estimate of an air amount to relieve the fuel tank vacuum responsive to the opening of the CPV may be determined. More specifically, a fuel tank vacuum level, or in other words an amount of intake air routed from downstream of the intake throttle (e.g., 62) to the fuel tank responsive to the opening of the CPV in order to relive fuel tank vacuum, may be determined.

An amount of intake air routed from downstream of the intake throttle to the fuel tank by opening the CPV in order to relieve fuel tank vacuum may result in air/fuel ratio error. More specifically, an initial throttle position may be set based on vehicle operator requested torque to meet the engine air demand, and a decrease in the air intake amount resulting from air routed from downstream of the intake throttle to the fuel tank responsive to CPV opening may disturb air/fuel ratio. As such, adjusting throttle (e.g., 62) plate position from its determined initial position responsive to a level of fuel tank vacuum (e.g., a determined amount of intake air routed from downstream of the intake throttle to the fuel tank) may reduce air/fuel ratio error resulting from CPV opening to relieve fuel tank vacuum. Accordingly, based on equations governing the dynamics of the intake manifold and fuel tank, a feedforward compensation term is calculated based on the indicated pressure difference between intake manifold and fuel tank, intake air temperature, measured or inferred fuel tank temperature, and gas space of the fuel tank, such that via throttle adjustment the manifold pressure may be impacted to a minimal level responsive to CPV opening. More specifically, in regard to the equations defined above with respect to FIG. 1, a feedforward air compensation term, $\Delta u$, may be calculated, such that:

$$\Delta u \approx V^* \beta_2 / RT(P_{man} - P_{tnk})^{-0.5}$$

and thus:

$$dP_{man}/dt = RT/V(u\_{maf}(t) + \Delta u) - \beta_1 * P_{man} - \beta_2 * (P_{man} - P_{tnk})^{-0.5} \text{ becomes} \approx RT/V^* u\_{maf}(t) - \beta_1 * P_{man}$$

Thus, at 220, a feedforward compensation term may be calculated such that, responsive to CPV opening, throttle adjustment may compensate for the determined amount of intake air routed from downstream of the intake throttle to the fuel tank in order to relieve fuel tank vacuum, thus maintaining an intake air amount based on vehicle operator requested torque and reducing air fuel ratio error as a result of fuel tank vacuum relief.

Following calculating the feedforward compensation term at 220, method 200 proceeds to 222. At 222, method 200 includes opening the CPV to initiate fuel tank vacuum relief. As such, upon indication of CPV opening, method 200 proceeds to 224 wherein the feedforward compensation term previously calculated at 220 is input to the engine's throttle control routine, which may determine a throttle position based on desired air mass, throttle inlet pressure, throttle inlet temperature, and a compensating factor that is tied to barometric pressure over manifold pressure, etc. In other words, as a desired air mass is adjusted based on manifold pressure, fuel tank pressure, fuel level, intake air temperature, measured or inferred fuel tank temperature, and fuel tank gas space, throttle plate position is adjusted accordingly to compensate for the air routed from downstream of the intake throttle to the fuel tank in order to relieve fuel tank vacuum.

Proceeding to 226, method 200 includes measuring an air/fuel ratio, using for example exhaust gas (air/fuel ratio) sensor 126. Because feedforward air compensation adjustment to throttle control is a predicted throttle adjustment based on a number of engine operating parameters, there may be a small amount of error inherent to the calculated adjustment. Thus, by measuring air/fuel ratio the accuracy of throttle adjustment based on the feedforward air compensation term may be determined. If the measured air/fuel ratio indicates that the feedforward air compensation term added to throttle control is resulting in an undesired air-fuel ratio (e.g., rich or lean air/fuel ratio), a learned compensating factor may be determined. For example, the compensating factor may be such that the calculated feedforward air compensation term is increased or decreased as a function of the compensating factor, thus resulting in throttle control more accurately maintaining air/fuel ratio at stoichiometry. In one example, the controller may adaptively learn adjustments to the feedforward compensation term that may be based on operating conditions, such as engine speed and load. The feedforward compensation term may be adjusted by adjusting the coefficients described above, for example.

Proceeding to 228, method 200 includes indicating whether the fuel tank vacuum has decayed to a second threshold. If fuel tank vacuum has not decayed to the second threshold, method 200 includes continuously adjusting the throttle position based on the difference between the determined amount of intake air that is routed from downstream of the intake throttle to the fuel tank and an air intake amount to meet the operator requested torque. If at 226, method 200 indicated a compensating factor based on measured air/fuel ratio, the learned compensating factor may be added to the feedforward compensation term calculation at 230. More specifically, upon opening the CPV to relieve fuel tank vacuum at 222, fuel tank vacuum may begin to decay. As such, at 228, fuel tank vacuum may be changed from an initial fuel tank vacuum level prior to opening the CPV, yet not to a second threshold. As the fuel tank vacuum level has changed, the feedforward compensation calculation is accordingly impacted, such that further adjustment to throttle position is needed in order to compensate for the change in fuel tank vacuum level, and this further adjustment may additionally be further corrected based on a learned compensating factor. As such, as excess fuel tank vacuum is relieved to the intake manifold, the amount of intake air to compensate for the fuel tank vacuum relief may be reduced, thus the level of throttle plate opening may be reduced accordingly. In this way, by continuously updating throttle position based on an updated feedforward compensation term calculated from manifold pressure, fuel tank pressure, fuel level, intake air temperature, measured or inferred fuel tank temperature, and further adjusting throttle position based on a learned compensating factor based on a measured air/fuel ratio, air/fuel ratio error may be reduced as fuel tank vacuum is being relieved. When it is indicated that fuel tank vacuum has decayed to a second threshold at 228, method 200 proceeds to 232 wherein the CPV is commanded closed. Method 200 then proceeds to 218, where engine operating parameters are updated as a result of the need for fuel tank vacuum relief. For example, updating engine operating parameters at 218 may include adjusting a fuel tank venting parameter, updating a canister purge schedule, updating an evaporative emissions leak test schedule, etc. Additionally, updating engine operating parameters at 218 may include indicating the need for additional diagnostic tests to isolate the source of the fuel tank vacuum build, notifying an operator of a potential problem with one or more fuel system components, and/or setting a diagnostic code. Method 200 may then end.

Figure 3:
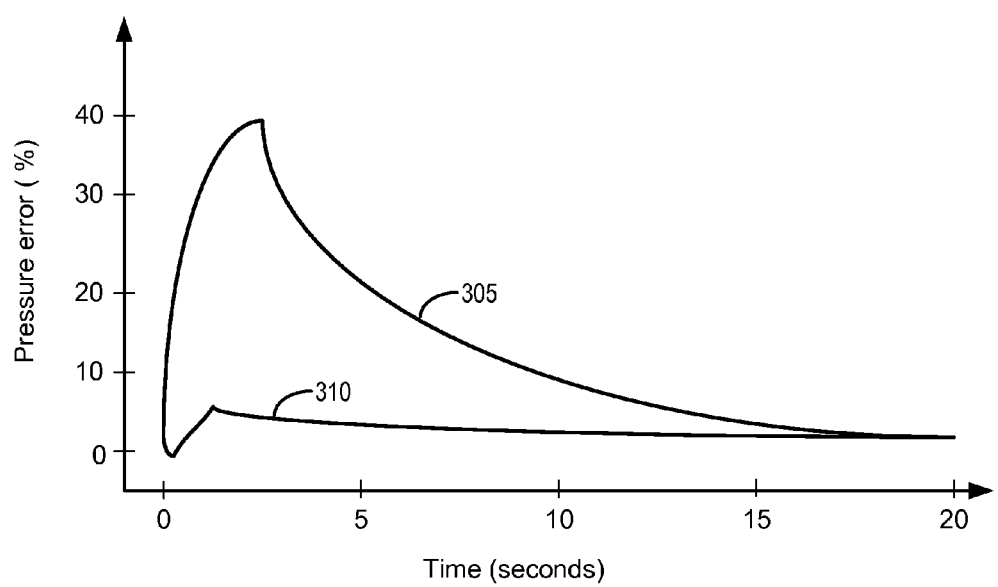
FIG. 3 shows a graph illustrating a reduction in intake manifold pressure error wherein fuel tank vacuum relief is compensated with throttle adjustment.

Now turning to FIG. 3, an example graph 300 illustrates the effect of fuel tank vacuum relief on intake manifold pressure via the opening of the CPV to relieve excess fuel tank vacuum to the intake manifold with and without feedforward air compensation. Graph 300 depicts time along the x (horizontal) axis and intake manifold pressure error (%) along the y (vertical) axis. The intake manifold pressure error may reflect the change in intake manifold pressure. Graph 300 includes plot 305, indicating intake manifold pressure error during fuel tank vacuum relief via CPV opening without feedforward air compensation, and plot 310, indicating intake manifold pressure error as a result of fuel tank vacuum relief via CPV opening with feedforward air compensation. As explained above, the feedforward air compensation may be used to adjust throttle position to compensate for a determined amount of air routed from downstream of the intake throttle to the fuel tank under conditions of fuel tank vacuum relief.

Responsive to an indication of fuel tank vacuum above a threshold, commanding open a CPV to relieve fuel tank vacuum to the intake manifold may result in a large intake manifold pressure error, indicated by plot 305, if feedforward air compensation to adjust throttle position is not utilized. For example, plot 305 indicates a condition wherein, responsive to a fuel tank vacuum above a threshold, the CPV is commanded open to relieve the fuel tank vacuum without compensating for intake manifold pressure, fuel tank pressure, intake air temperature, measured or inferred fuel tank temperature, and gas space. As such, manifold pressure error rapidly increases upon CPV opening, and after reaching a peak pressure error, begins to decay. The initial rise in pressure error results from an amount of air routed from downstream of the intake throttle to the fuel tank. As the fuel tank vacuum is relieved, the pressure error decays as less air is routed from downstream of the intake throttle to the fuel tank until eventually the fuel tank vacuum has been relieved and no intake manifold pressure error is indicated, the result of intake manifold air intake amount meeting torque demand.

Alternatively, plot 310 indicates a condition wherein, responsive to a fuel tank vacuum above a threshold, a feedforward air compensation term is first calculated based on manifold pressure, fuel tank pressure, intake air temperature, measured or inferred fuel tank temperature, and gas space. Subsequently, upon opening the CPV to relieve fuel tank vacuum to the intake manifold, the feedforward compensation term is added to throttle control such that the throttle plate is adjusted to compensate for a determined amount of air routed from downstream of the intake manifold to the fuel tank. Further, the feedforward air compensation term is continually updated, thus resulting in continuous throttle adjustment, during the time course of fuel tank vacuum relief while the CPV is open, providing continuous intake air compensation based on the changing level of fuel tank vacuum. In some examples, a measurement of air/fuel ratio may be utilized to determine the accuracy of throttle adjustment based on the feedforward air compensation term, and if the measured air/fuel ratio indicates that the feedforward air compensation term added to throttle control is resulting in a rich or lean air/fuel ratio, for example, a learned compensating factor may be determined as discussed above in regard to the method described in FIG. 2, and added to the feedforward compensation term calculation. As such, by adjusting throttle position to compensate for the air routed from downstream of the intake manifold to the fuel tank to relieve the fuel tank vacuum, manifold pressure error, and accordingly, air/fuel ratio error, is reduced.

FIG. 4 shows an example timeline 400 for relieving excess fuel tank vacuum to intake manifold in a vehicle being propelled by a combustion engine using feedforward air compensation to reduce air/fuel ratio error according to the methods described herein and with reference to FIG. 2-3 and as applied to the systems described herein and with reference to FIG. 1. Timeline 400 includes plot 402, indicating a vehicle operator requested torque over time. Timeline 400 further includes plot 404, indicating an extent of throttle opening based on vehicle operator requested torque, and includes throttle adjustment based on feedforward air compensation during conditions wherein excess fuel tank vacuum may be relieved to the intake manifold, over time. Line 406 indicates the extent of throttle opening if throttle adjustment based on feedforward compensation during fuel tank vacuum relief is not indicated. Timeline 400 further includes plot 408, indicating manifold pressure, and includes conditions wherein throttle adjustments compensate for fuel tank vacuum relief, over time. Line 410 indicates the manifold pressure if throttle position is not adjusted to compensate for fuel tank vacuum relief. Timeline 400 further includes plot 412, indicating the open or closed state of a canister purge valve, over time. Opening of the canister purge valve may be used to relieve excess fuel tank vacuum to the intake manifold. Timeline 400 further includes plot 414, indicating a fuel tank pressure level, over time. Line 418 indicates a first fuel tank vacuum threshold level, indicating the need for fuel tank vacuum relief. Line 416 indicates a second fuel tank vacuum threshold level, wherein, responsive to fuel tank vacuum relief to the intake manifold, the vacuum level has decayed such that the fuel tank vacuum relief method may end.

At time $t_0$ the vehicle is operating at a level of torque indicated by plot 402. Accordingly, the throttle is opened to an extent based on the torque demand, indicated by plot 404. Based on the level of torque demand and throttle opening, a manifold pressure is indicated, represented by plot 408. Fuel tank vacuum relief is not indicated, as the fuel tank pressure, indicated by plot 414, is above the threshold for fuel tank vacuum relief, indicated by line 418. As such, the canister purge valve, indicated by plot 412, is closed.

At time $t_1$ the torque demand begins increasing, and accordingly, the level of throttle opening increases such that the torque demand may be met by increasing intake manifold air charge. As a result of the increased amount of air, manifold pressure increases accordingly.

At time $t_2$ the torque demand begins decreasing, and accordingly, the level of throttle opening decreases such that the decreasing torque demand is accompanied by a decrease in air charge. Further, as a result of the decreased torque demand, manifold pressure accordingly begins to decline.

Between time $t_2$ and $t_3$ engine torque declines and then remains constant and thus the extent of throttle opening declines and then remains constant to match engine torque demand. Accordingly, manifold pressure level declines to a level based on the torque demand and throttle opening. However, fuel tank pressure, indicated by plot 414, begins to decline indicating the development of fuel tank vacuum. Development of fuel tank vacuum during engine operating conditions may be the result of valve degradation, for example a canister vent valve, or blockage in the fuel lines comprising, for example snow, water, dust, dirt, etc. At time $t_3$ fuel tank vacuum crosses a first threshold, indicated by line 418. In particular, the threshold may indicate a vacuum level exceeding 16 InH20, for example. As fuel tank vacuum has developed to a threshold level, relief is indicated in order to mitigate damage to the fuel tank.

As the engine is combusting, opening the CPV to relieve the fuel tank vacuum to the engine intake manifold may result in a large intake manifold pressure error, if feedforward air compensation to adjust throttle position is not utilized. To reduce the intake manifold pressure error resulting from fuel tank vacuum relief, between time $t_3$ and $t_4$ a pressure difference between the intake manifold pressure and the fuel tank pressure, an intake air temperature, a measured or inferred fuel tank temperature, and a gas space of the fuel tank are indicated such that an estimate of an air amount to relieve the fuel tank vacuum responsive to the opening of the CPV may be determined. By estimating an amount of air determined to relieve the fuel tank vacuum, throttle plate position may be accordingly adjusted to compensate for the amount of air routed from downstream of the intake throttle to the fuel tank. In other words, based on equations governing the dynamics of the intake manifold and fuel tank, a feedforward compensation term is calculated such that via throttle adjustments, manifold pressure may be impacted to a minimal level responsive to CPV opening, thus maintaining an intake air amount based on vehicle operator requested torque and reducing air fuel ratio error as a result of fuel tank vacuum relief.

Following calculation of the feedforward air compensation term between time $t_3$ and $t_4$, at time $t_4$ the canister purge valve is commanded open to relieve excess fuel tank vacuum to the intake manifold. As such, upon indication of CPV opening, the feedforward compensation term is added to throttle control. In other words, based on manifold pressure, fuel tank pressure, intake air temperature, measured or inferred fuel tank temperature, and gas space, a throttle plate position is adjusted accordingly to compensate for the air routed from downstream of the intake throttle to the fuel tank in order to relieve fuel tank vacuum. As such, between time $t_4$ and $t_5$, vehicle operator requested torque does not change, yet responsive to CPV opening, the extent of throttle opening rises, and then decays to compensate for the amount of air routed from downstream of the intake throttle to the fuel tank. The extent of throttle opening rise and decay results from a continuous adjustment of the throttle position based on a continuously updated difference between the determined amount of intake air that is routed from downstream of the intake throttle to the fuel tank and an air charge demand to meet the operator requested torque. In other words, between time $t_4$ and $t_5$ the feedforward air compensation term is continually adjusted to account for fuel tank vacuum relief. For example, upon opening the CPV to relieve fuel tank vacuum, fuel tank vacuum begins to decay. As the fuel tank vacuum level changes, the feedforward compensation calculation is accordingly impacted, such that further adjustment to throttle position is indicated in order to compensate for the change in fuel tank vacuum level. In other words, as excess fuel tank vacuum is relieved to the intake manifold, the amount of intake air to compensate for the fuel tank vacuum relief may be reduced, thus the level of throttle plate opening may be reduced accordingly. In this way, by continuously updating throttle position based on an updated feedforward compensation term, fuel tank vacuum may be relieved, without affecting manifold pressure, indicated by plot 408. In some examples, as described further in regard to the method in FIG. 2 and the graph illustrated in FIG. 3, a measurement of air/fuel ratio may be additionally utilized to determine the accuracy of throttle adjustment based on the feedforward air compensation term, and if the measured air/fuel ratio indicates that the feedforward air compensation term added to throttle control is resulting in a rich or lean air/fuel ratio, a compensating factor may be determined and added to the feedforward compensation term calculation. However, in the example herein illustrated in FIG. 4, the feedforward compensation term calculation sufficiently predicted throttle plate position during fuel tank vacuum relief without affecting manifold pressure, thus additional throttle adjustment is not indicated. In another example, in a situation wherein fuel tank relief is indicated and a throttle adjustment based on a feedforward air compensation calculation is not utilized, upon opening the CPV to relieve fuel tank vacuum, the extent of throttle opening is not adjusted accordingly, indicated by line 406, and as a result, intake manifold pressure is considerably affected, indicated by plot 410. As such, by not compensating for the amount of air routed from downstream of the intake manifold to the fuel tank responsive to opening the CPV to relieve fuel tank vacuum, likelihood of air/fuel ratio error is high.

At time $t_5$ fuel tank vacuum crosses a second threshold, indicating the dissipation of fuel tank vacuum such that fuel tank vacuum relief is complete. As such, the canister purge valve is commanded closed. Between time $t_5$ and $t_6$, as vehicle operator requested torque increases, the extent of throttle opening increases accordingly. As manifold pressure change is no longer compensated for, as throttle opening increases, manifold pressure rises accordingly.

Now turning to FIG. 5, an example timeline 500 is shown for relieving excess fuel tank vacuum to intake manifold in a vehicle being propelled by a combustion engine in which feedforward compensation throttle adjustment needs further adjustment via a learned feedforward compensation adjustment factor, using methods described herein and with respect to FIG. 2, and as applied to the systems described herein and with respect to FIG. 1. Timeline 500 includes plot 502, indicating a fuel tank pressure level, over time. Line 504 indicates a first fuel tank vacuum threshold level, indicating the need for fuel tank vacuum relief. Line 506 indicates a second fuel tank vacuum threshold level, wherein, responsive to fuel tank vacuum relief to the intake manifold, the vacuum level has decayed such that the fuel tank vacuum relief method may end. Timeline 500 further includes plot 508, indicating the open or closed state of a canister purge valve, over time. Opening of the canister purge valve may be used to relieve excess fuel tank vacuum to the intake manifold. Timeline 500 further includes plot 510, indicating an actual extent of throttle opening based on vehicle operator requested torque and includes throttle adjustment based on feedforward air compensation during conditions wherein excess fuel tank vacuum may be relieved to the intake manifold, over time. The extent of throttle opening indicated by plot 510 may be further adjusted based on a learned feedforward compensation adjustment factor, such that an optimal air/fuel ratio is maintained during fuel tank vacuum relief, described in further detail below. Timeline 500 further includes plot 512, indicating an optimal extent of throttle opening during fuel tank vacuum relief, over time. In other words, plot 512 indicates an extent of throttle opening based on feedforward compensation in which further adjustment via a learned feedforward compensation adjustment factor, is not necessary to maintain optimal air/fuel ratio. Timeline 500 further includes plot 514, indicating an air/fuel ratio, over time. Air/fuel ratio may be measured using, for example, exhaust gas (air/fuel ratio) sensor 126. Line 516 indicates a condition wherein air/fuel ratio is maintained at stoichiometry. Timeline 500 further includes plot 518, indicating fuel injection parameters, over time. For example, fuel injection, indicated by pot 518, may be increased or decreased in order to maintain air/fuel ratio at stoichiometry, depending on whether a lean, or rich, respectively, air/fuel ratio is indicated. Line 520 indicates a condition wherein air/fuel ratio is maintained at stoichiometry without fuel injection adjustment.

At time $t_0$ the vehicle is in operation, being propelled by engine combustion. Fuel tank pressure, indicated by plot 502, is above a threshold 504, thus fuel tank vacuum relief is not indicated. As such, the canister purge valve, indicated by plot 508, is closed. The extent of throttle opening, indicated by plot 510, is based on vehicle operator requested torque demand, air/fuel ratio, indicated by plot 514, is at stoichiometry, and thus an increase or decrease in fuel injection, indicated by plot 518, is not indicated.

Between time $t_0$ and $t_1$ fuel tank vacuum builds. As discussed above, development of fuel tank vacuum during engine operating conditions may be the result of valve degradation, or blockage in the fuel lines comprising, for example snow, water, dust, dirt, etc. At time $t_1$ fuel tank vacuum crosses a first threshold, indicated by line 504. In particular, the threshold may indicate a vacuum level exceeding 16 InH20, for example. As fuel tank vacuum has developed to a threshold level, relief is indicated in order to mitigate damage to the fuel tank.

As discussed above in regard to the method described in FIG. 2, the graph illustrated in FIG. 3, and the timeline described in FIG. 4, as the engine is combusting, opening the CPV to relieve the fuel tank vacuum to the engine intake manifold may result in a large intake manifold pressure error, if feedforward air compensation to adjust throttle position is not utilized. Thus, between time $t_1$ and $t_2$, based on equations governing the dynamics of the intake manifold and fuel tank, a feedforward compensation term is calculated such that via throttle adjustments, manifold pressure may be impacted to a minimal level responsive to CPV opening, thus maintaining an intake air amount based on vehicle operator requested torque and reducing air fuel ratio error as a result of fuel tank vacuum relief.

Following calculation of the feedforward air compensation term between time $t_1$ and $t_2$, at time $t_2$ the canister purge valve is commanded open to relieve excess fuel tank vacuum to the intake manifold. As such, upon indication of CPV opening, the feedforward compensation term is added to throttle control. The extent of throttle opening thus increases accordingly, indicated by plot 510. However, in this example the actual extent of throttle opening, indicated by plot 510, based on feedforward air compensation is slightly less than an optimal extent of throttle opening, indicated by plot 512, to maintain air/fuel ratio at stoichiometry. In other words, the feedforward air compensation throttle adjustment did not fully compensate for the amount of air routed from downstream of the intake throttle to the fuel tank during fuel tank vacuum relief, thus resulting in a rich air/fuel ratio, indicated by plot 514. As indicated, between time $t_2$ and $t_3$, to compensate for the rich air/fuel ratio, fuel injection may be decreased, indicated by plot 518.

Between time $t_3$ and $t_4$, the actual extent of throttle opening, indicated by plot 510, based on feedforward air compensation is slightly more than an optimal extent of throttle opening, indicated by plot 512, to maintain air/fuel ratio at stoichiometry. In other words, the feedforward air compensation throttle adjustment overcompensated for the amount of air routed from downstream of the intake throttle to the fuel tank during fuel tank vacuum relief, thus resulting in a lean air/fuel ratio, indicated by plot 514. As such, between time $t_3$ and $t_4$, to compensate for the lean air/fuel ratio, fuel injection may be increased, indicated by plot 518.

As described further in regard to the method in FIG. 2 and the graph illustrated in FIG. 3, if the measured air/fuel ratio indicates that the feedforward air compensation term added to throttle control is resulting in a rich or lean air/fuel ratio, a compensating factor may be determined and added to the feedforward compensation term calculation. As such, between time $t_2$ and $t_4$, wherein the measured air fuel ratio is rich (between $t_2$ and $t_3$), and lean (between $t_3$ and $t_4$), a feedforward compensation adjustment factor may be learned based on the measured air/fuel ratio, and added to the feedforward compensation term calculation in order to improve the throttle adjustment prediction such that air/fuel ratio is maintained at stoichiometry during fuel tank vacuum relief. Accordingly, by adding the learned feedforward compensation adjustment factor to the feedforward compensation term calculation, by time $t_4$ the actual extent of throttle opening, is optimal (plot 510 and 512 are overlaid) such that between time $t_4$ and $t_5$ air/fuel ratio is maintained at stoichiometry during fuel tank vacuum relief via throttle adjustment control.

At time $t_5$ fuel tank vacuum crosses a second threshold, indicating the dissipation of fuel tank vacuum such that fuel tank vacuum relief is complete. As such, the canister purge valve is commanded closed. Between time $t_5$ and $t_6$, the extent of throttle opening is based on vehicle operator requested torque, and air/fuel ratio is maintained at stoichiometry.

In this way, in response to elevated fuel tank vacuum levels, a canister purge valve may be opened to dissipate excess fuel tank vacuum to an engine intake manifold both while the engine is not combusting, or alternatively, while the engine is combusting, regardless of whether there is a potential for air/fuel ratio error as a result of fuel tank vacuum relief. Fuel tank vacuum levels may become excessive, for example, as a result of blockage in the fuel lines, or the result of valve degradation. While pressure relief valves and vent valves may be coupled to the fuel system to reduce the likelihood of excessive fuel tank vacuum, there may be conditions wherein due to hardware malfunction adequate pressure relief may not be achieved. Thus, a method enabling rapid and fuel tank vacuum relief regardless of engine operating conditions decreases the likelihood that fuel tank vacuum may not be relieved on time, reducing costly fuel tank repairs and MIL warranty, increasing operator satisfaction, and may decrease evaporative emissions resulting from damaged fuel system components.

The technical effect of enabling fuel tank vacuum relief under conditions wherein the likelihood of air/fuel ratio error is high, is adjusting throttle control based on a feedforward air compensation calculation. Responsive to elevated fuel tank vacuum levels, a pressure difference between the intake manifold and fuel tank is indicated, in addition to a measured or inferred fuel tank temperature, intake air temperature, and gas space of the fuel tank. As such, an estimate of the air amount to relieve the fuel tank vacuum responsive to the opening of the CPV may be determined. By calculating a feedforward compensation term to account for the determined amount of air routed from downstream of the intake manifold to the fuel tank to relieve the fuel tank vacuum, and adjusting the throttle accordingly, manifold pressure error may be reduced, thus enabling fuel tank vacuum relief even under engine operating conditions wherein the likelihood of air/fuel ratio error is high.

The systems described herein and with reference to FIG. 1, along with the methods described herein and with reference to FIG. 2 may enable one or more systems and one or more methods. In one example, a method for a fuel system coupled to an engine, comprises, in response to a fuel tank vacuum level, opening a canister purge valve (CPV) to dissipate the fuel tank vacuum level into an engine intake manifold while the engine is combusting, and adjusting an amount of intake air inducted into the intake manifold based on the fuel tank vacuum level. In a first example of the method, the method includes wherein in response to a fuel tank vacuum level includes one or more of in response to fuel tank vacuum level being higher than a threshold level and in response to a rise in fuel tank vacuum level being higher than a threshold rate. A second example of the method optionally includes the first example and further comprises closing the CPV responsive to the fuel tank vacuum level dropping below a threshold level. A third example of the method optionally includes one or more of the first and second examples and further includes wherein adjusting the amount of intake air inducted into the intake manifold based on the fuel tank vacuum level comprises adjusting the amount of intake air inducted into the intake manifold based on one or more of a pressure difference between the intake manifold and the fuel tank, an intake air temperature, a measured or inferred fuel tank temperature, and a gas space of the fuel tank, the gas space determined based on fuel level and fuel tank volume. A fourth example of the method optionally includes any one or more of each of the first through third examples and further includes wherein adjusting an amount of intake air inducted into the intake manifold based on the fuel tank vacuum level includes adjusting a position of intake throttle upstream of the intake manifold. A fifth example of the method optionally includes any one or more of the first through fourth examples and further includes wherein adjusting the position of the intake throttle comprises setting an initial position of the intake throttle based on vehicle operator requested torque and adjusting the initial position based on the level of fuel tank vacuum. A sixth example of the method optionally includes any one or more of the first through fifth examples and further comprises continuously adjusting the position of the intake throttle based on the fuel tank vacuum level as the fuel tank vacuum is being dissipated. A seventh example of the method optionally includes any one or more of the first through sixth examples and further includes wherein continuously adjusting the position of the intake throttle based on the fuel tank vacuum level includes further adjusting the position of the throttle based on a measured air/fuel ratio.

Another example of a method for a fuel system coupled in a vehicle, comprises, responsive to a first condition, opening a canister purge valve (CPV) to route intake air from downstream of an intake throttle to a fuel tank while an engine is not combusting, and, responsive to a second condition, opening the CPV to route intake air from downstream of the intake throttle to the fuel tank while the engine is combusting, and adjusting an amount of intake air inducted into the intake manifold based on a determined amount of the intake air that is routed from downstream of the intake throttle to the fuel tank. In a first example of the method, the method includes wherein the vehicle is a hybrid vehicle, and wherein the first condition includes a fuel tank vacuum level above a threshold level or a rise in fuel tank vacuum level being higher than a threshold rate and the hybrid vehicle being propelled in a battery mode. A second example of the method optionally includes the first example and further includes wherein the second condition includes the fuel tank vacuum level above the threshold level or the rise in fuel tank vacuum level being higher than the threshold rate and the hybrid vehicle being propelled by the engine. A third example of the method optionally includes one or more of the first and second examples and further comprises closing the CPV responsive to fuel tank vacuum below a threshold level. A fourth example of the method optionally includes one or more of the first through third examples and further includes wherein the determined amount of the intake air that is routed from downstream of the intake throttle to the fuel tank is determined based on one or more of a pressure difference between the intake manifold and the fuel tank, an intake air temperature, a fuel tank temperature, the fuel tank temperature inferred based on one or more of ambient temperature and engine on time, a gas space of the fuel tank, the gas space of the fuel tank based on fuel level. A fifth example of the method optionally includes one or more of the first through fourth examples and further includes wherein the fuel system does not include a pressure relief valve. A sixth example of the method optionally includes one or more of the first through fifth examples and further includes wherein adjusting an amount of intake air inducted into the intake manifold includes setting an initial throttle position based on vehicle operator requested torque, determining a difference between the determined amount of the intake air that is routed from downstream of the intake throttle to the fuel tank and an air charge demand to meet the operator requested torque, and adjusting the throttle position based on the difference. A seventh example of the method optionally includes the first through sixth examples and further comprises continuously adjusting throttle position based on the difference between the determined amount of the intake air that is routed from downstream of the intake throttle to the fuel tank and an air charge demand to meet the operator requested torque, the continuously adjusted throttle position further adjusted based on a measured air/fuel ratio.

An example of a fuel system of a vehicle, comprises a fuel tank coupled to an engine intake manifold of an engine via a conduit comprising a fuel vapor canister; a canister purge valve (CPV) coupled between the fuel vapor canister and the engine intake manifold; a throttle, positioned within an air intake passage coupled to the engine intake manifold; and a controller storing instructions in non-transitory memory, that when executed, cause the controller to: responsive to a fuel tank vacuum level being higher than a threshold level or in response to a rise in fuel tank vacuum level being higher than a threshold rate, while the engine is combusting, open the CPV to route intake air from downstream of the throttle to the fuel tank, and adjust a position of the throttle based on a determined amount of the intake air that is routed from downstream of the throttle to the fuel tank; and close the CPV responsive to fuel tank vacuum dropping below a threshold level. In a first example, the system further includes wherein the vehicle is a hybrid vehicle configured to be propelled in one or more of an engine mode and a battery mode, and wherein the instructions further include instructions that when executed cause the controller to, responsive to the fuel tank vacuum level being higher than the threshold level or in response to the rise in fuel tank vacuum level being higher than the threshold rate, while the engine is not combusting, open the CPV to route intake air from downstream of the intake throttle to the fuel tank; wherein the engine is not combusting, the hybrid vehicle is being propelled in the battery mode. A second example of the system optionally includes the first example and further includes wherein the amount of the intake air that is routed from downstream of the throttle to the fuel tank is determined based on one or more of a pressure difference between the intake manifold and the fuel tank, an intake air temperature measured by an intake air temperature sensor, a fuel tank temperature inferred based on one or more of ambient temperature and engine on time, a gas space of the fuel tank, the gas space of the fuel tank based on fuel level. A third example of the system optionally includes one or more of the first and second examples and further includes wherein adjusting a position of the throttle based on a determined amount of the intake air that is routed from downstream of the throttle to the fuel tank comprises continually adjusting the position of the throttle based on a feedforward air compensation term such that intake manifold pressure does not change as a result of routing intake air from downstream of the throttle to the fuel tank, and further comprises adjusting the feedforward compensation term based on a measured air/fuel ratio.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a fuel system coupled to an engine, comprising:
   in response to a fuel tank vacuum level,
   opening a canister purge valve (CPV) to dissipate the fuel tank vacuum level into an engine intake manifold while the engine is combusting, and
   adjusting an amount of intake air inducted into the intake manifold based on the fuel tank vacuum level.

2. The method of claim 1, wherein in response to a fuel tank vacuum level includes one or more of in response to fuel tank vacuum level being higher than a threshold level and in response to a rise in fuel tank vacuum level being higher than a threshold rate.

3. The method of claim 1, further comprising closing the CPV responsive to the fuel tank vacuum level dropping below a threshold level.

4. The method of claim 1, wherein adjusting the amount of intake air inducted into the intake manifold based on the fuel tank vacuum level comprises adjusting the amount of intake air inducted into the intake manifold based on one or more of a pressure difference between the intake manifold and the fuel tank, an intake air temperature, a measured or inferred fuel tank temperature, the fuel tank temperature inferred based on one or more of ambient temperature and engine on time, and a gas space of the fuel tank, the gas space determined based on fuel level and fuel tank volume.

5. The method of claim 1, wherein adjusting an amount of intake air inducted into the intake manifold based on the fuel tank vacuum level includes adjusting a position of intake throttle upstream of the intake manifold.

6. The method of claim 5, wherein adjusting the position of the intake throttle comprises setting an initial position of the intake throttle based on vehicle operator requested torque and adjusting the initial position based on the level of fuel tank vacuum.

7. The method of claim 5, further comprising continuously adjusting the position of the intake throttle based on the fuel tank vacuum level as the fuel tank vacuum is being dissipated.

8. The method of claim 7, wherein continuously adjusting the position of the intake throttle based on the fuel tank vacuum level includes further adjusting the position of the throttle based on a measured air/fuel ratio.

9. A method for a fuel system coupled in a vehicle, comprising:
responsive to a first condition, opening a canister purge valve (CPV) to route intake air from downstream of an intake throttle to a fuel tank while an engine is not combusting; and
responsive to a second condition, opening the CPV to route intake air from downstream of the intake throttle to the fuel tank while the engine is combusting, and adjusting an amount of intake air inducted into the intake manifold based on a determined amount of the intake air that is routed from downstream of the intake throttle to the fuel tank.

10. The method of claim 9, wherein the vehicle is a hybrid vehicle, and wherein the first condition includes a fuel tank vacuum level above a threshold level or a rise in fuel tank vacuum level being higher than a threshold rate and the hybrid vehicle being propelled in a battery mode.

11. The method of claim 10, wherein the second condition includes the fuel tank vacuum level above the threshold level or the rise in fuel tank vacuum level being higher than the threshold rate and the hybrid vehicle being propelled by the engine.

12. The method of claim 11, further comprising:
closing the CPV responsive to fuel tank vacuum below a threshold level.

13. The method of claim 9, wherein the determined amount of the intake air that is routed from downstream of the intake throttle to the fuel tank is determined based on one or more of a pressure difference between the intake manifold and the fuel tank, an intake air temperature, a fuel tank temperature, the fuel tank temperature inferred based on one or more of ambient temperature and engine on time, a gas space of the fuel tank, the gas space of the fuel tank based on fuel level.

14. The method of claim 9, wherein the fuel system does not include a pressure relief valve.

15. The method of claim 9, wherein adjusting an amount of intake air inducted into the intake manifold includes setting an initial throttle position based on vehicle operator requested torque,
determining a difference between the determined amount of the intake air that is routed from downstream of the intake throttle to the fuel tank and an air charge demand to meet the operator requested torque, and
adjusting the throttle position based on the difference.

16. The method of claim 15, further comprising:
continuously adjusting throttle position based on the difference between the determined amount of the intake air that is routed from downstream of the intake throttle to the fuel tank and an air charge demand to meet the operator requested torque, the continuously adjusted throttle position further adjusted based on a measured air/fuel ratio.

17. A fuel system of a vehicle, comprising:
a fuel tank coupled to an engine intake manifold of an engine via a conduit comprising a fuel vapor canister;
a canister purge valve (CPV) coupled between the fuel vapor canister and the engine intake manifold;
a throttle, positioned within an air intake passage coupled to the engine intake manifold; and
a controller storing instructions in non-transitory memory, that when executed, cause the controller to:
responsive to a fuel tank vacuum level being higher than a threshold level or in response to a rise in fuel tank vacuum level being higher than a threshold rate, while the engine is combusting, open the CPV to route intake air from downstream of the throttle to the fuel tank, and adjust a position of the throttle based on a determined amount of the intake air that is routed from downstream of the throttle to the fuel tank; and
close the CPV responsive to fuel tank vacuum dropping below a threshold level.

18. The fuel system coupled to an engine of claim 17, wherein the vehicle is a hybrid vehicle configured to be propelled in one or more of an engine mode and a battery mode, and wherein the instructions further include instructions that when executed cause the controller to, responsive to the fuel tank vacuum level being higher than the threshold level or in response to the rise in fuel tank vacuum level being higher than the threshold rate, while the engine is not combusting, open the CPV to route intake air from downstream of the intake throttle to the fuel tank;
wherein the engine is not combusting, the hybrid vehicle is being propelled in the battery mode.

19. The fuel system of claim 17, wherein the amount of the intake air that is routed from downstream of the throttle to the fuel tank is determined based on one or more of a pressure difference between the intake manifold and the fuel tank, an intake air temperature measured by an intake air temperature sensor, a fuel tank temperature, the fuel tank temperature inferred based on one or more of ambient temperature and engine on time, a gas space of the fuel tank, the gas space of the fuel tank based on fuel level.

20. The fuel system of claim 17, wherein adjusting a position of the throttle based on a determined amount of the intake air that is routed from downstream of the throttle to the fuel tank comprises continually adjusting the position of the throttle based on a feedforward air compensation term such that intake manifold pressure does not change as a result of routing intake air from downstream of the throttle to the fuel tank, and
further comprising adjusting the feedforward compensation term based on a measured air/fuel ratio.

* * * * *